(12) United States Patent
Brace et al.

(10) Patent No.: US 11,237,356 B2
(45) Date of Patent: Feb. 1, 2022

(54) CONTEXT-BASED FOCUS CONTROL OF A MICROSCOPE

(71) Applicant: VIAVI Solutions Inc., San Jose, CA (US)

(72) Inventors: Jay Brace, Seattle, WA (US); Andrew Parsons, Brier, WA (US)

(73) Assignee: VIAVI Solutions Inc., San Jose, CA (US)

( * ) Notice: Subject to any disclaimer, the term of this patent is extended or adjusted under 35 U.S.C. 154(b) by 262 days.

(21) Appl. No.: 16/532,201

(22) Filed: Aug. 5, 2019

(65) Prior Publication Data
US 2020/0049945 A1    Feb. 13, 2020

Related U.S. Application Data

(60) Provisional application No. 62/716,776, filed on Aug. 9, 2018.

(51) Int. Cl.
| | |
|---|---|
| *G02B 7/28* | (2021.01) |
| *G06F 9/30* | (2018.01) |
| *G02B 21/24* | (2006.01) |

(52) U.S. Cl.
CPC ........... *G02B 7/282* (2013.01); *G02B 21/241* (2013.01); *G06F 9/30* (2013.01)

(58) Field of Classification Search
CPC ........ G02B 21/241; G02B 23/26; G02B 7/28; G02B 7/282; G06F 9/30; G06K 9/3233; G06K 9/00134
See application file for complete search history.

(56) References Cited

U.S. PATENT DOCUMENTS

| | | | | |
|---|---|---|---|---|
| 5,604,351 A | * | 2/1997 | Bisconte | G02B 21/241 250/201.7 |
| 2016/0246046 A1 | * | 8/2016 | Yorav Raphael | G02B 21/26 |

* cited by examiner

*Primary Examiner* — Joseph P Martinez
*Assistant Examiner* — Vipin Patel
(74) *Attorney, Agent, or Firm* — Harrity & Harrity, LLP (57) ABSTRACT

A device may include an input component and a focus control component. The focus control component may receive, from the input component, an input associated with adjusting a focus of a field of view of the device. The focus control component may determine whether an area of interest is present in the field of view. The focus control component may adjust, based on determining that the area of interest is not present in the field of view, the focus of the field of view at a focus speed associated with the input, or, based on determining that the area of interest is present in the field of view, may determine one or more parameters for modifying the focus speed, modify the focus speed based on the one or more parameters, and adjust the focus of the field of view at the modified focus speed.

20 Claims, 10 Drawing Sheets

CONTEXT-BASED FOCUS CONTROL OF A MICROSCOPE

RELATED APPLICATION

This application claims priority under 35 U.S.C. § 119 to U.S. Provisional Patent Application No. 62/716,776, filed on Aug. 9, 2018, and entitled "CONTEXT-BASED FOCUS CONTROL OF A MICROSCOPE," the content of which is incorporated by reference herein in its entirety.

BACKGROUND

A microscope may include an instrument used to see objects that are too small to be seen by the naked eye. Microscopy may include investigating small objects and structures using a microscope. A microscope may include an optical microscope, which uses light passed through a sample to produce an image, a fluorescence microscope, an electron microscope, a scanning probe microscope, and/or the like.

DETAILED DESCRIPTION

The following detailed description of example implementations refers to the accompanying drawings. The same reference numbers in different drawings may identify the same or similar elements.

A technician may use a device, such as an optical fiber microscope, to examine an optical fiber of an optical cable. For example, the optical fiber may be placed in a field of view of the device, and the device may capture images, live video, and/or the like, of the optical fiber so that the device (and/or another device) may analyze the optical fiber for defects, damage, and/or the like. To capture images, live video, and/or the like of the optical fiber, a motor of the device may adjust a focus in the field of view of the device. The motor may adjust the focus in the field of view such that the focus may be increased and/or decreased.

In some cases, the capability of the device to adjust the focus of the field of view may be automatic (e.g., the device may adjust the focus without input from a technician), manual (e.g., the device may adjust the focus based on input received from the technician), and/or the like. In some cases, the device may be unable to fully achieve focus in the field of view using the autofocus capability of the device, and accordingly, the technician may focus the field of view using manual focus. However, manual focus controls may be difficult to use because the ability to quickly control the focus, and the ability to precisely control the focus, may be at odds. For example, mechanical variability in functioning of the device (e.g., accuracy of mechanical movement, wear of mechanical parts, and/or the like) and/or technician error (e.g., movement by the technician) may cause the device to adjust the focus in the field of view too quickly (which may cause the device to overshoot the point of optimal focus in the field of view), may cause the device to adjust the focus in the field of view too slowly (which may increase the amount of time it takes for the device to achieve the point of optimal focus in the field of view), and/or the like.

Some implementations described herein provide a device that is capable of context-based focus control. The device may receive an input associated with adjusting a focus of a field of view of the device, may determine whether an area of interest is present in the field of view, may determine one or more parameters for modifying the input based on whether the area of interest is present in the field of view, and may modify the input based on the one or more parameters. In this way, the device may adjust the focus of the field of view based on the modified input, such that the device may adjust the focus at a high focus speed when the area of interest is not present in the field of view, and may switch to a slower and more precise focus speed when the area of interest is present in the field of view. This increases the device's manual focus capabilities, by allowing the device to quickly reach the area of interest in the field of view, and to override technician input, in order to slow down focus adjustments to a more granular and precise focus speed, once the area of interest has been reached. Further, this conserves processing resources of the device by reducing the likelihood of overshoot of the point of optimal focus due to the device adjusting the focus too quickly when the device is close to achieving the point of optimal focus.

Figure 1A:
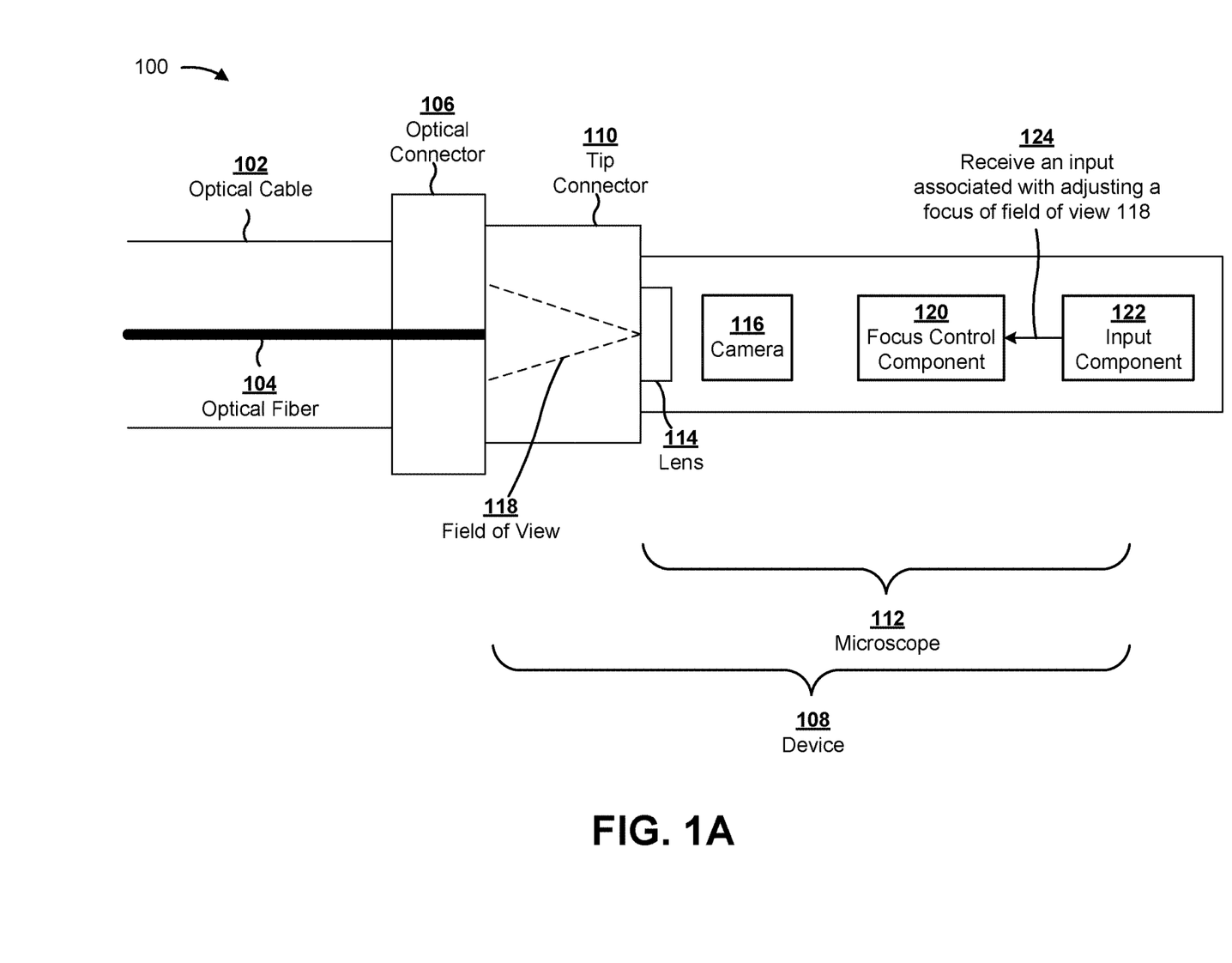
FIGS. 1A-1E are diagrams of one or more example implementations described herein.

FIGS. 1A-1E are diagrams of one or more example implementations 100 described herein. As shown in FIG. 1A, example implementations 100 may include an optical cable 102 that includes one or more optical fibers 104, and an optical connector 106 that is attached to optical cable 102 (e.g., optical fiber 104 may be mounted in interstitial material within optical connector 106 connected to optical cable 102). Further, example implementations 100 may include a device 108 (e.g., a handheld device 108) to be used to analyze optical fiber 104. Device 108 includes a tip connector 110 that permits device 108 to attach to optical cable 102 via optical connector 106. Further, device 108 includes a microscope 112, which may be focused relative to optical fiber 104 to obtain (e.g., capture) a set of images and/or video of optical fiber 104 and/or to analyze optical fiber 104.

Microscope 112 includes various components to be used to analyze optical fiber 104 (e.g., electronic components, optical components, mechanical components, and/or the like). For example, microscope 112 may include a lens 114 for viewing optical fiber 104. As further shown in FIG. 1A, microscope 112 may include and/or may be connected to a camera 116 to be used to capture a set of images and/or video of optical fiber 104. For example, camera 116 may capture a set of images and/or video that are to be analyzed by device 108 (or another device communicatively connected to device 108) to identify a defect, damage, and/or the like related to optical fiber 104. Continuing with the previous example, device 108 may provide the set of images and/or video to a server or a computing resource (e.g., of a cloud computing environment) to permit the server or computing resource to perform an analysis of the set of images and/or video. In some implementations, device 108 may use camera 116 to capture an image and/or video of objects within field of view 118 of camera 116.

As further shown in FIG. 1A, microscope 112 may include and/or may be connected to one or more components for controlling microscope 112, such as a focus control component 120, an input component 122, and/or the like. Focus control component 120 may include a motor, one or more processing devices, and/or the like, and may be capable of automatically and/or manually (e.g., based on receiving an input via input component 122) adjusting a focus of field of view 118. For example, focus control component 120, via the one or more processing components, may control the motor to move lens 114 relative to camera 116 and/or optical fiber 104 (e.g., move lens 114 in a side-to-side direction, move lens 114 in an up-and-down direction, move lens 114 closer to optical fiber 104, move lens 114 further from optical fiber 104, and/or the like) to adjust the focus in field of view 118.

Input component 122 may include various types of input components, such as a mouse and keyboard, a touchscreen, a joystick, a thumbstick, a button, and/or the like. In some implementations, inputs received via input component 122 may be used to control various parameters (e.g., focus speed, focus acceleration, and/or the like) for adjusting the focus of field of view 118. For example, input component 122 may be actuated to gradually increase or decrease the focus speed at which focus control component 120 adjusts the focus of field of view 118, may be actuated to increase or decrease the focus speed at which focus control component 120 adjusts the focus of field of view 118 in discrete steps, and/or the like.

As shown by reference number 124, focus control component 120 may receive, via input component 122, an input associated with adjusting a focus in field of view 118. For example, the input may be received based on a technician actuating a joystick at a particular displacement in a particular direction. The input may correspond to a particular focus speed, a particular focus acceleration, and/or a particular focus direction at which focus control component 120 is to adjust the focus in field of view 118. For example, the greater the displacement of input component 122, the greater the focus speed at which focus control component 120 is to adjust the focus in field of view 118. Moreover, depending on the focus speed at which the focus of field of view 118 is being adjusted at the time focus control component 120 receives the input, focus control component 120 may determine an amount of focus acceleration that focus control component 120 is to use to achieve the amount of focus speed corresponding to the input. As an example, focus control component 120 may adjust the focus of field of view 118 at a greater focus acceleration the slower the focus speed at which the focus of field of view 118 is being adjusted when focus control component 120 receives the input.

Figure 1B:
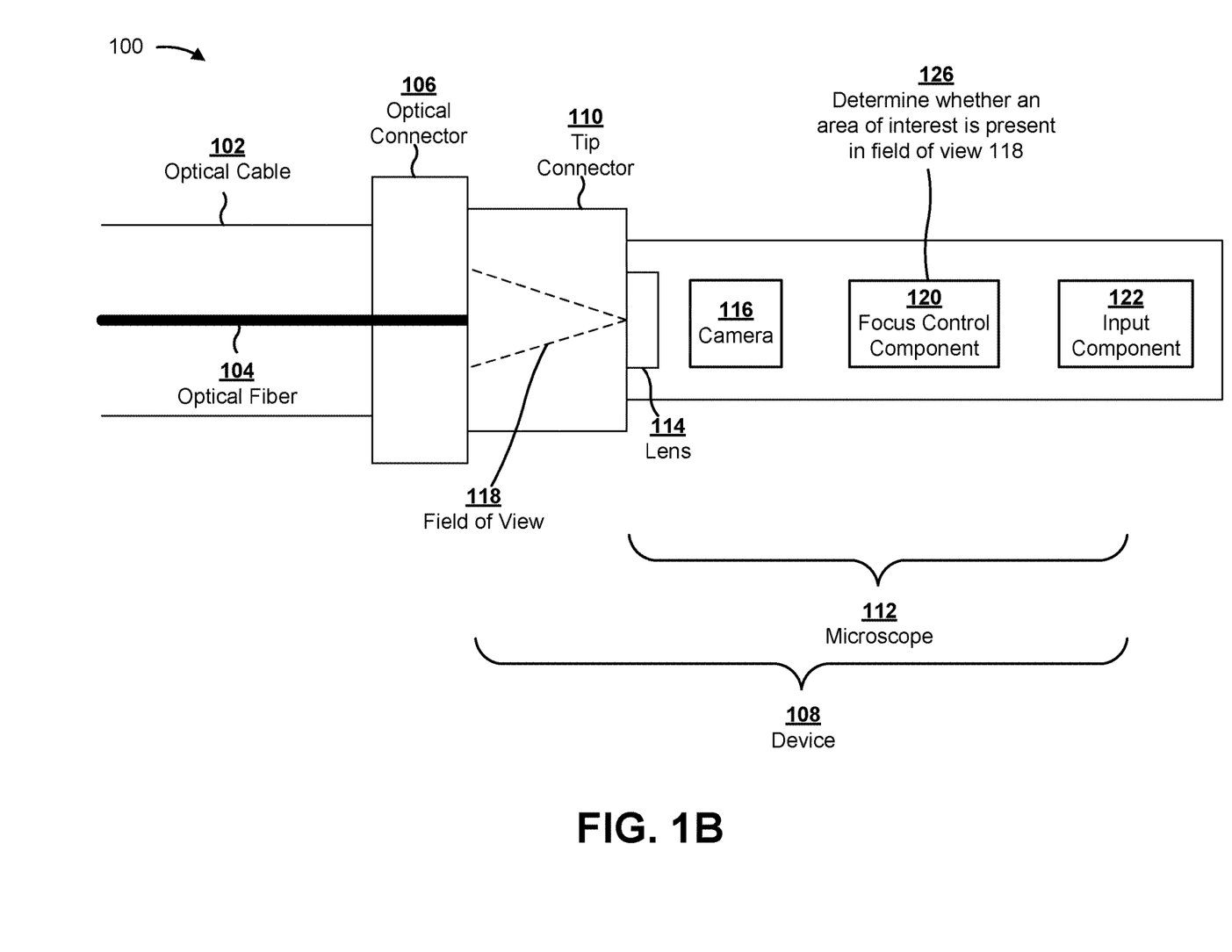

As shown in FIG. 1B, and by reference number 126, focus control component 120 may determine whether an area of interest is present in field of view 118. An area of interest may include one or more visual phenomena of interest to the technician providing the input. In some implementations, focus control component 120 may determine whether an area of interest is present in the entire view of field of view 118, whether an area of interest is present in one or more portions of field of view 118, and/or the like. In some implementations, focus control component 120 may determine whether an area of interest is present in field of view 118 based on various visual indicators, such as based on a level of contrast between one or more features in field of view 118, based on differences in color between one or more features in field of view 118, based on differences in luminance between one or more features in field of view 118, and/or the like. As an example, focus control component 120 may determine that an area of interest is present in field of view 118 based on a level of contrast between optical fiber 104 and the interstitial material surrounding optical fiber 104. For example, focus control component 120 may determine that an area of interest is present in field of view 118 if the level of contrast between optical fiber 104 and the interstitial material satisfies a threshold level of contrast.

Figure 1C:
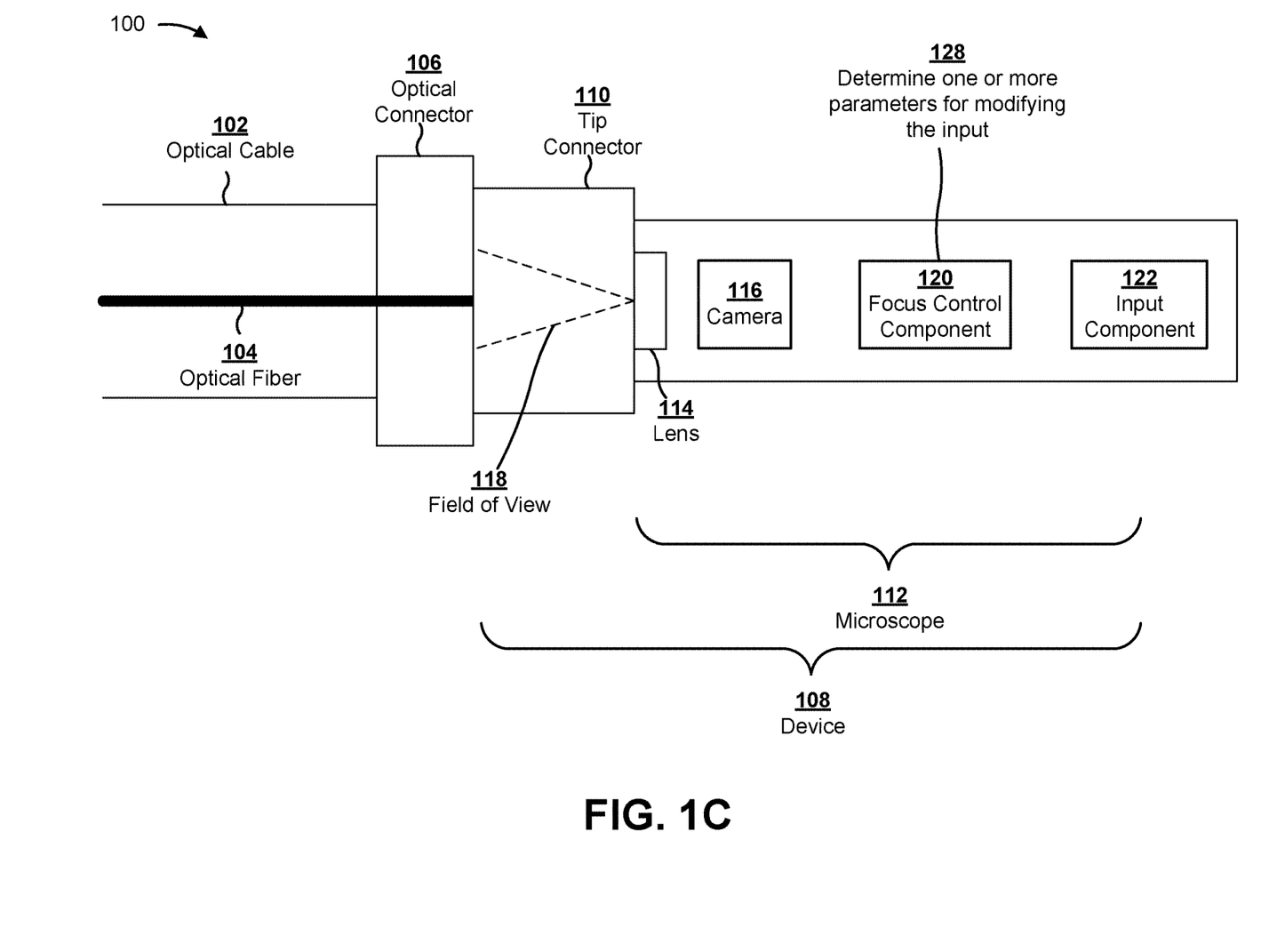

As shown in FIG. 1C, and by reference number 128, focus control component 120 may determine one or more parameters for modifying the input. For example, focus control component 120 may determine one or more parameters for modifying the input based on whether an area of interest is present in field of view 118. In some implementations, if an area of interest is not present in field of view 118, focus control component 120 may determine to not modify the input, and may accordingly adjust the focus of field of view 118 based on the focus speed, focus acceleration, focus direction, and/or the like, corresponding to the input. In some implementations, if an area of interest is present in field of view 118, focus control component 120 may determine the one or more parameters for modifying the input.

In some implementations, the one or more parameters may include, for example, an amount to modify the focus speed corresponding to the input (e.g., an amount to increase or decrease the focus speed), an amount to modify the focus acceleration corresponding to the input (e.g., an amount to increase or decrease the focus acceleration), and/or the like. Focus control component 120 may determine the one or more parameters based on various factors. For example, focus control component 120 may determine the focus speed, the focus acceleration, and/or the like, at which the focus of field of view 118 is to be adjusted, and may modify the input based on the determined focus speed, the determined focus acceleration, and/or the like.

In some implementations, focus control component 120 may determine the focus speed, the focus acceleration, and/or the like, at which the focus of field of view 118 is to be adjusted based on various factors, such as the size of optical fiber 104 (e.g., based on the diameter of optical fiber 104, based on a percentage of field of view 118 that is occupied by optical fiber 104, and/or the like), based on a type of fiber associated with optical fiber 104 (e.g., multimode fiber, single mode fiber, OM4 fiber, OM5 fiber, and/or the like), based on being provisioned with the one or more parameters, and/or the like. In some implementations, the one or more parameters may gradually change depending on various visual indicators associated with field of view 118, such as a level of contrast between one or more features in field of view 118, differences in color between one or more features in field of view 118, differences in luminance between one or more features in field of view 118, and/or the like. In this way, focus control component 120 may dynamically change the focus speed, the focus acceleration, and/or the like, as the focus of field of view 118 dynamically changes.

Based on determining the focus speed, the focus acceleration, and/or the like, at which the focus of field of view 118 is to be adjusted, focus control component 120 may determine the one or more parameters for adjusting the input. For example, focus control component 120 may use the determined focus speed at which the focus of field of view 118 is to be adjusted as a threshold focus speed, may use the determined focus acceleration at which the focus of field of view 118 is to be adjusted as a threshold focus acceleration, and/or the like. Accordingly, focus control component 120 may determine that the focus speed corresponding to the input satisfies the threshold focus speed and may determine the one or more parameters for increasing or decreasing the focus speed corresponding to the input to match the threshold focus speed, may determine that the focus acceleration corresponding to the input satisfies the threshold focus acceleration and may determine the one or more parameters for increasing or decreasing the focus acceleration corresponding to the input to match the threshold focus acceleration, and/or the like.

Figure 1D:
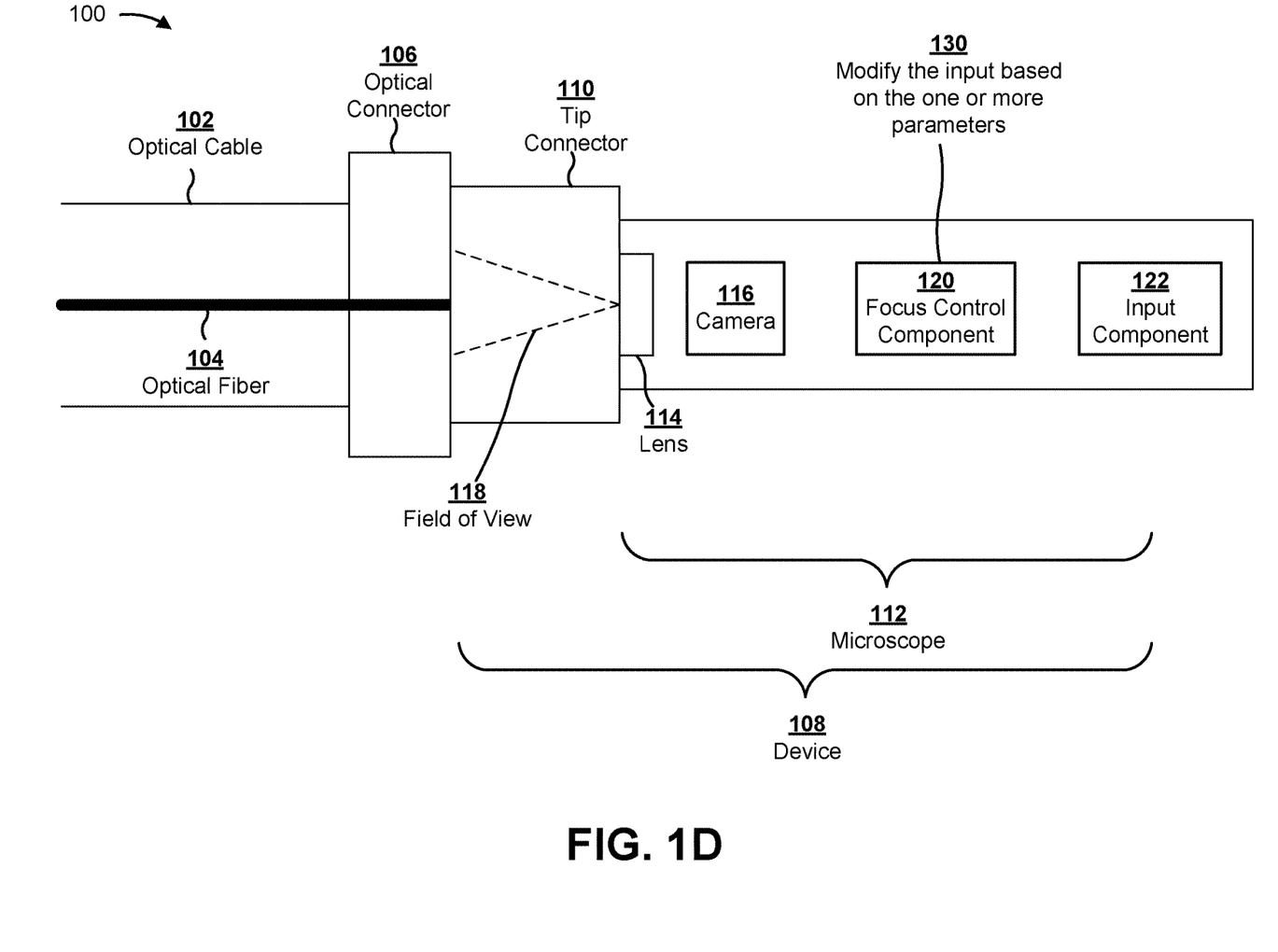

As shown by FIG. 1D, and by reference number 130, focus control component 120 may modify the input based on the one or more parameters. For example, focus control component 120 may increase or decrease the focus speed corresponding to the input to match the threshold focus speed, may increase or decrease the focus acceleration corresponding to the input to match the threshold focus acceleration, and/or the like.

Figure 1E:
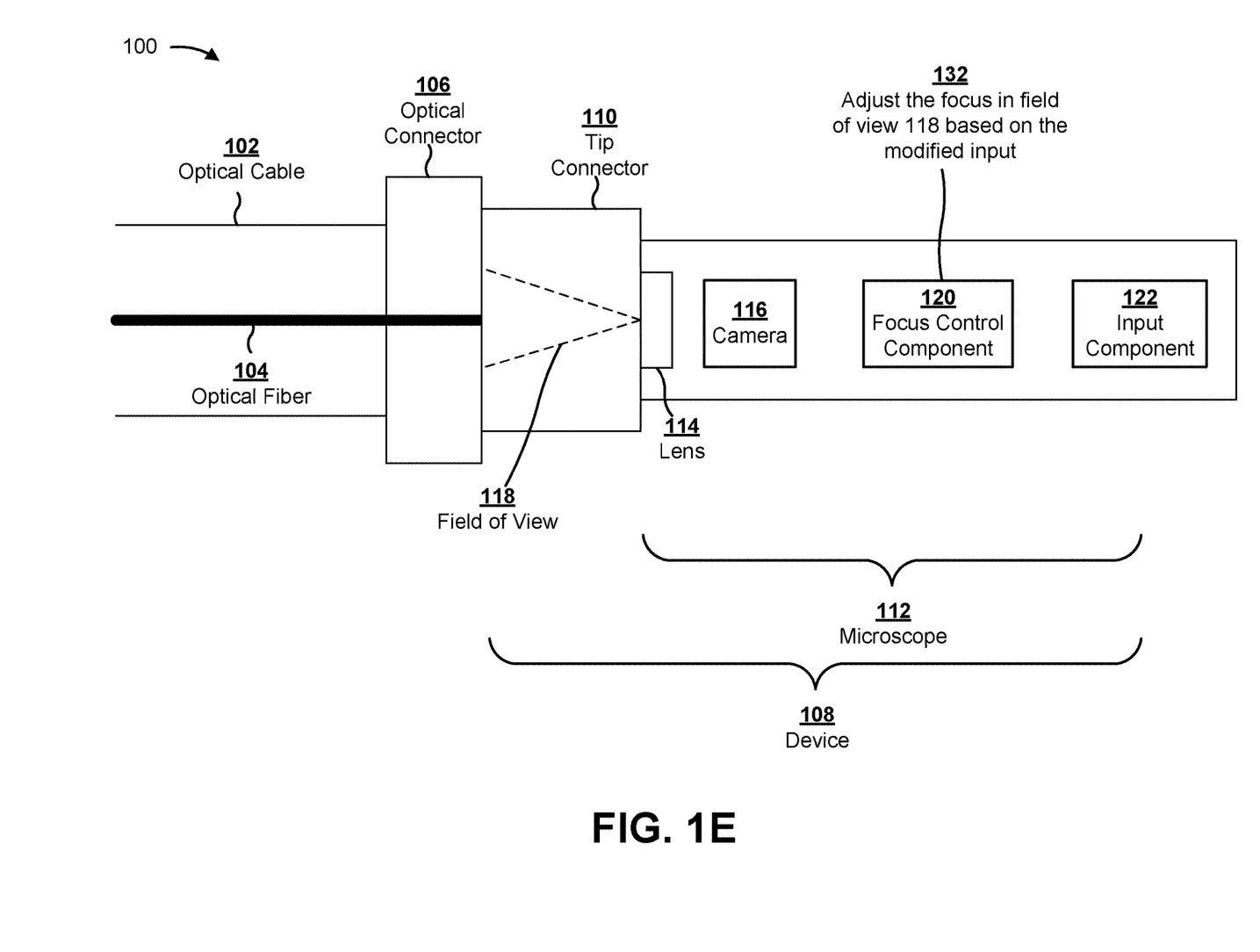

As shown by FIG. 1E, and by reference number 132, focus control component 120 may adjust the focus in field of view 118 based on the modified input. In this way, device 108 may be capable of context-based focus control. Device 108 may receive an input associated with adjusting a focus of field of view 118 of device 108, may determine whether an area of interest is present in field of view 118, may determine one or more parameters for modifying the input based on whether the area of interest is present in field of view 118, and may modify the input based on the one or more parameters. In this way, device 108 may adjust the focus of field of view 118 based on the modified input, such that device 108 may adjust the focus at a high focus speed when the area of interest is not present in field of view 118, and may switch to a slower and more precise focus speed when the area of interest is present in field of view 118. This increases device 108's manual focus capabilities, by allowing device 108 to quickly reach the area of interest in field of view 118, and to override technician input to slow down focus adjustments to a more granular and precise focus speed once the area of interest has been reached. Further, this conserves processing resources of device 108 by reducing the likelihood of overshoot of the point of optimal focus due to device 108 adjusting the focus too quickly when device 108 is close to achieving the point of optimal focus.

As indicated above, FIGS. 1A-1E are provided merely as one or more examples. Other examples may differ from what is described with regard to FIGS. 1A-1E. In practice, there may be additional components, fewer components, different components, or differently arranged components than those shown in FIGS. 1A-1E. Furthermore, two or more components shown in FIGS. 1A-1E may be implemented within a single component, or a single component shown in FIGS. 1A-1E may be implemented as multiple, distributed components. Additionally, or alternatively, a set of components (e.g., two or more components) shown in FIGS. 1A-1E may perform one or more functions described as being performed by another set of components shown in FIGS. 1A-1E.

Figure 2:
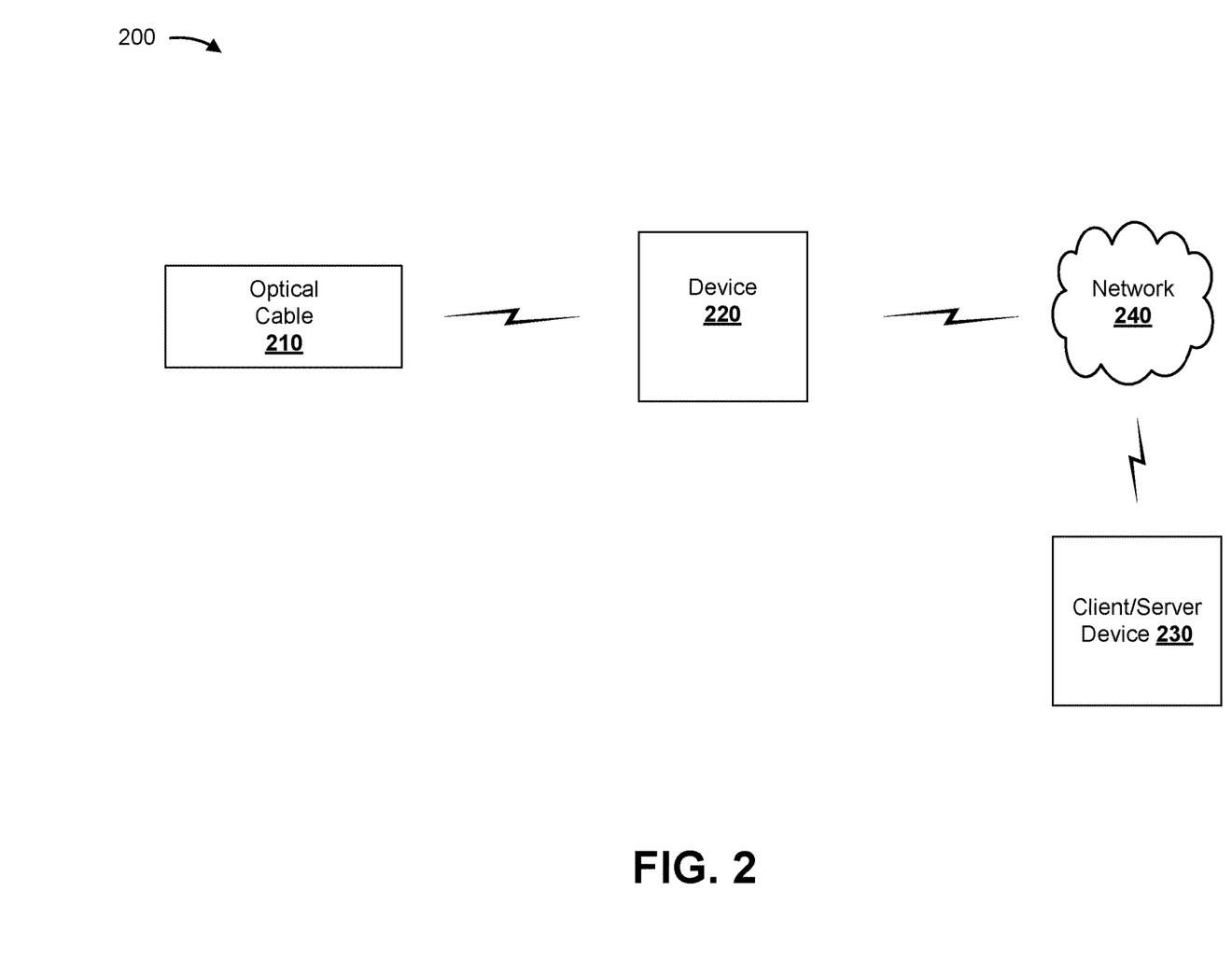
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include optical cable 210, device 220, a client device or a server device (hereinafter referred to as client/server device 230), and network 240. Devices of environment 200 may interconnect via wired connections, wireless connections, or a combination of wired and wireless connections.

Optical cable 210 includes a cable containing one or more optical fibers that are to be used to carry light from a source device to a destination device. For example, optical cable 210 may include a ribbon optical cable, a loose tube optical cable, a drop optical cable, a central core cable, and/or a similar type of cable. In some implementations, optical cable 210 may be connected to device 220 (e.g., via an optical connector and/or a tip connector), as described elsewhere herein.

Device 220 includes one or more devices capable of capturing, receiving, storing, generating, processing, and/or providing an image of an optical fiber of optical cable 210. For example, device 220 may include an optical probe, an optical fiber microscope, a fault locator, an optical fiber inspection microscope, and/or a similar type of device. In some implementations, device 220 may move a camera relative to optical cable 210 and may capture an image of a set of optical fibers within a field of view of the camera, as described elsewhere herein. Additionally, or alternatively, device 220 may adjust a focus of a field of view in which a view of one or more fibers included in optical cable 210 is included. For example, device 220 may adjust the focus of the field of view based on whether an area of interest is present in the field of view.

Client/server device 230 includes one or more devices capable of receiving, generating, storing, processing, and/or providing an image of an optical fiber of an optical cable. For example, client/server device 230 may include a desktop computer, a mobile phone (e.g., a smart phone or a radiotelephone), a laptop computer, a tablet computer, a wearable communication device (e.g., a smart wristwatch or a pair of smart eyeglasses), a server device, a computing resource, or a similar type of device. In some implementations, client/server device 230 may receive an image captured by device 220, as described elsewhere herein.

Network 240 includes one or more wired and/or wireless networks. For example, network 240 may include a wireless network (e.g., a long-term evolution (LTE) network, a code division multiple access (CDMA) network, a 3G network, a 4G network, a 5G network, a Wi-Fi network, or another type of wireless network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
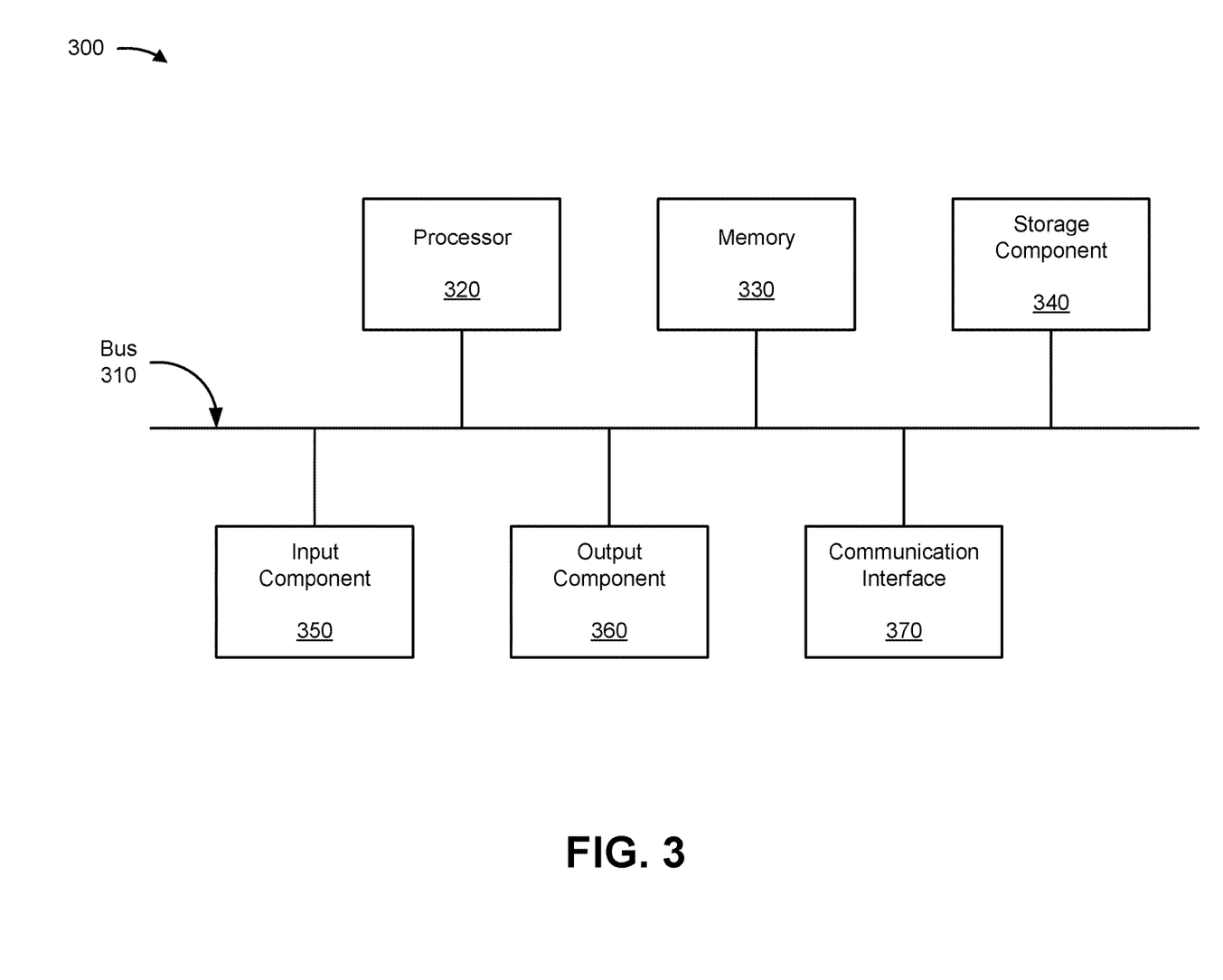
FIG. 3 is a diagram of example components of one or more devices of FIG. 2.

FIG. 3 is a diagram of example components of a device 300. Device 300 may correspond to device 220 and/or to client/server device 230. In some implementations, device 220 and/or client/server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
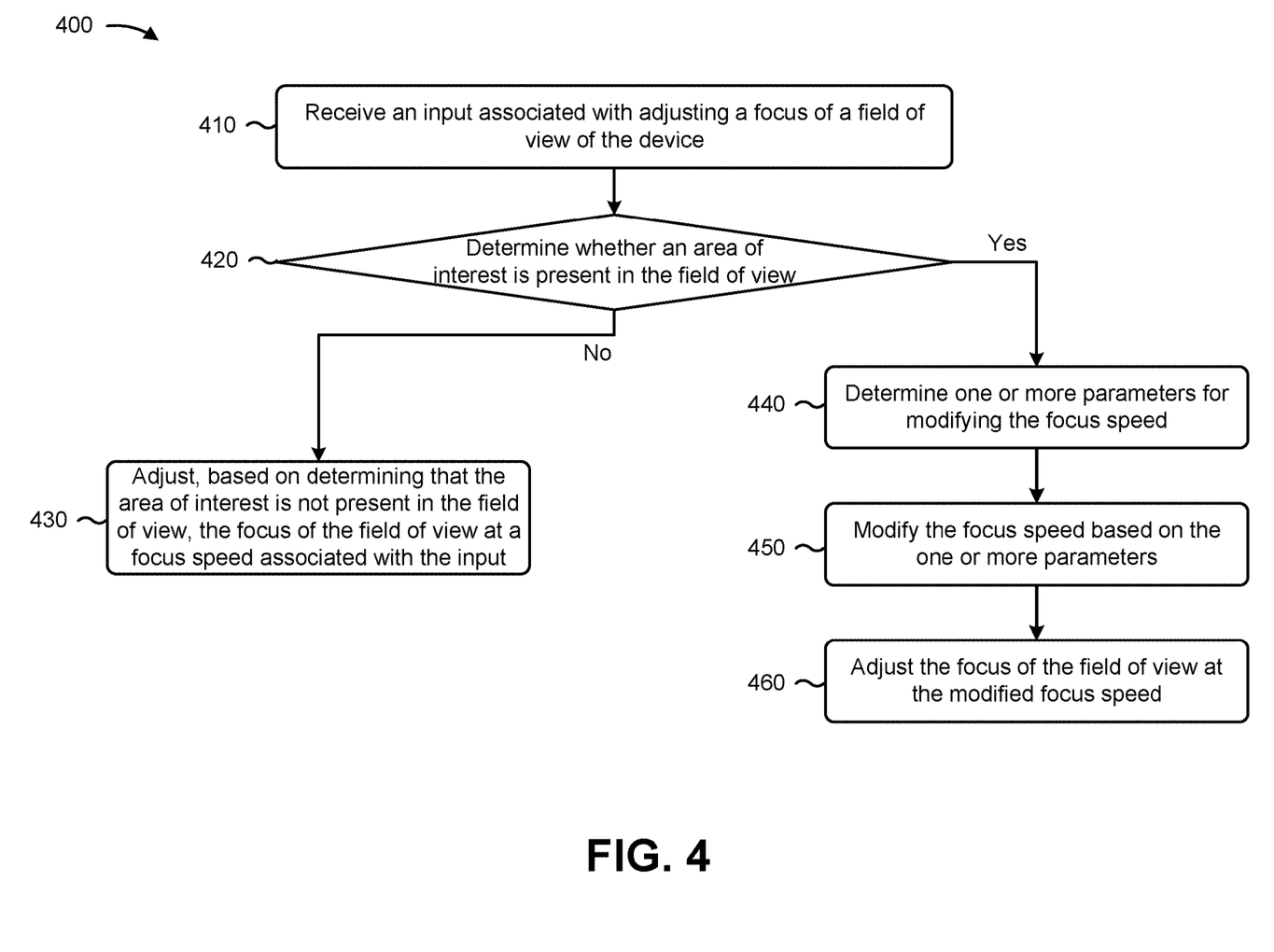
FIGS. 4-6 are flowcharts of example processes for context-based focus control of a microscope.

FIG. 4 is a flow chart of an example process 400 for context-based focus control of a microscope. In some implementations, one or more process blocks of FIG. 4 may be performed by a device (e.g., device 220). In some implementations, one or more process blocks of FIG. 4 may be performed by another device or a group of devices separate from or including the device, such as a client/server device (e.g., client/server device 230).

As shown in FIG. 4, process 400 may include receiving an input associated with adjusting a focus of a field of view of the device (block 410). For example, the device (e.g., using focus control component 120, input component 122, processor 320, memory 330, storage component 340, input component 350, output component 360, communication interface, and/or the like) may receive an input associated with adjusting a focus of a field of view of the device, as described above in connection with FIGS. 1A-1E.

As shown in FIG. 4, process 400 may include determining whether an area of interest is present in the field of view (block 420). For example, the device (e.g., using focus control component 120, processor 320, memory 330, storage component 340, input component 350, output component 360, communication interface, and/or the like) may determine whether an area of interest is present in the field of view, as described above in connection with FIGS. 1A-1E.

As shown in FIG. 4, based on determining that the area of interest is not present in the field of view (block 420—No), process 400 may include adjusting the focus of the field of view at a focus speed associated with the input (block 430). For example, the device (e.g., using lens 114, focus control component 120, processor 320, memory 330, storage component 340, input component 350, output component 360, communication interface, and/or the like) may adjust the focus of the field of view at a focus speed associated with the input, as described above in connection with FIGS. 1A-1E.

As shown in FIG. 4, based on determining that the area of interest is present in the field of view (block 420—Yes), process 400 may include determining one or more parameters for modifying the focus speed (block 440). For example, the device (e.g., using focus control component 120, processor 320, memory 330, storage component 340, input component 350, output component 360, communication interface, and/or the like) may determine one or more parameters for modifying the focus speed, as described above in connection with FIGS. 1A-1E.

As shown in FIG. 4, based on determining that the area of interest is present in the field of view (block 420—Yes), process 400 may include modifying the focus speed based on the one or more parameters (block 450). For example, the device (e.g., using focus control component 120, processor 320, memory 330, storage component 340, input component 350, output component 360, communication interface, and/or the like) may modify the focus speed based on the one or more parameters, as described above in connection with FIGS. 1A-1E.

As shown in FIG. 4, based on determining that the area of interest is present in the field of view (block 420—Yes), process 400 may include adjusting the focus of the field of view at the modified focus speed (block 460). For example, the device (e.g., using lens 114, focus control component 120, processor 320, memory 330, storage component 340, input component 350, output component 360, communication interface, and/or the like) may adjust the focus of the field of view at the modified focus speed, as described above in connection with FIGS. 1A-1E.

Process 400 may include additional implementations, such as any single implementation or any combination of implementations described below and/or in connection with one or more other processes described elsewhere herein.

In a first implementation, determining whether the area of interest is present in the field of view comprises determining a level of contrast in the field of view, and determining whether the area of interest is present in the field of view based on the level of contrast in the field of view. In a second implementation, alone or in combination with the first implementation, determining the one or more parameters for modifying the focus speed comprises determining whether the focus speed associated with the input satisfies a threshold focus speed, and determining to modify the focus speed by reducing the focus speed to the threshold focus speed. In a third implementation, alone or in combination with one or more of the first or second implementations, modifying the focus speed based on the one or more parameters comprises reducing the focus speed to the threshold focus speed.

In a fourth implementation, alone or in combination with one or more of the first through third implementations, the input associated with adjusting the focus of a field of view of the microscope is associated with a focus acceleration. In a fifth implementation, alone or in combination with one or more of the first through fourth implementations, process 400 further comprises adjusting, based on determining that the area of interest is not present in the field of view, the focus of the field of view at the focus acceleration associated with the input. In a sixth implementation, alone or in combination with one or more of the first through fifth implementations, process 400 further comprises determining, based on determining that the area of interest is present in the field of view, a modified focus acceleration, and adjusting the focus of the field of view at the modified focus acceleration.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
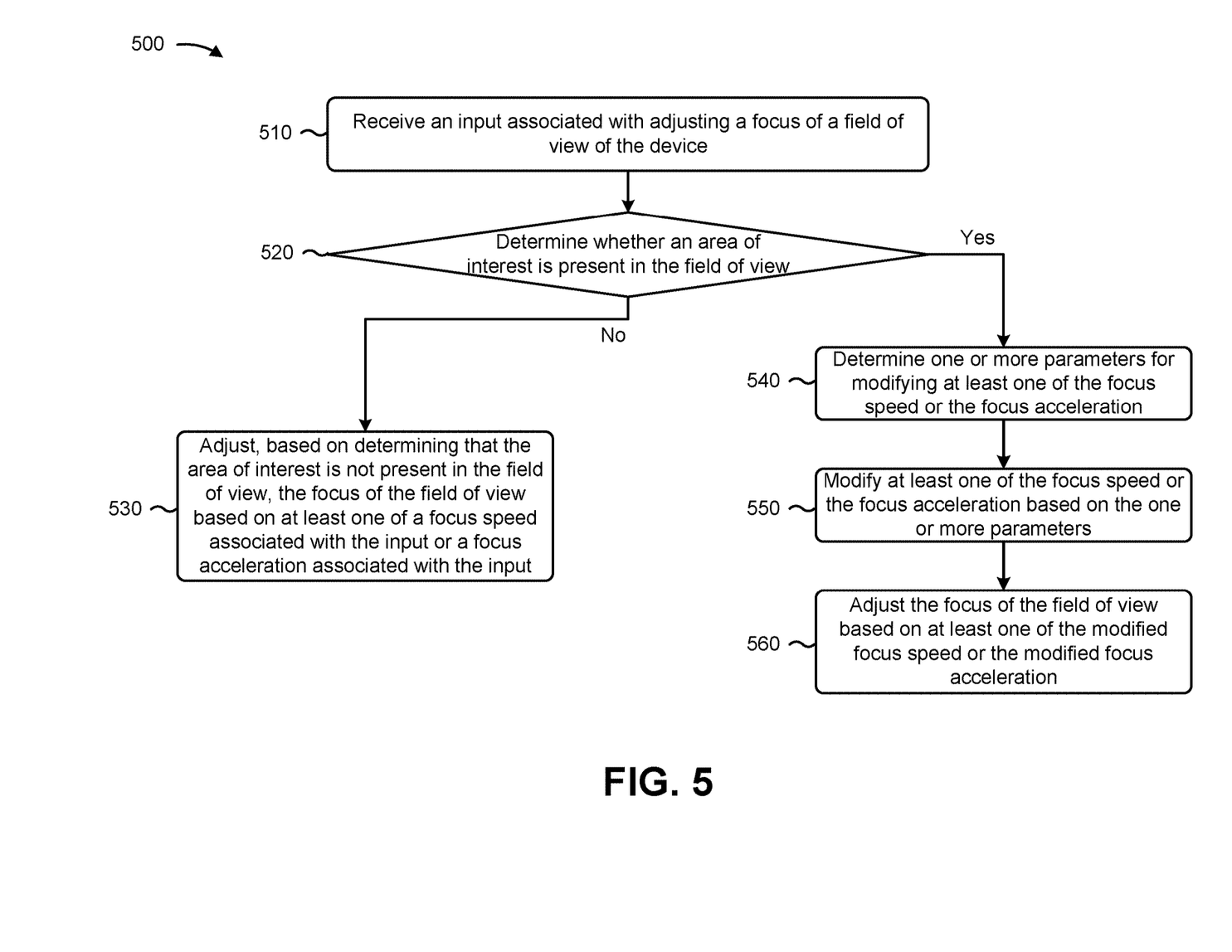

FIG. 5 is a flow chart of an example process 500 for context-based focus control of a microscope. In some implementations, one or more process blocks of FIG. 5 may be performed by a device (e.g., device 220). In some implementations, one or more process blocks of FIG. 5 may be performed by another device or a group of devices separate from or including the device, such as a client/server device (e.g., client/server device 230).

As shown in FIG. 5, process 500 may include receiving an input associated with adjusting a focus of a field of view of the device (block 510). For example, the device (e.g., using focus control component 120, input component 122, processor 320, memory 330, storage component 340, input component 350, output component 360, communication interface, and/or the like) may receive an input associated with adjusting a focus of a field of view of the device, as described above in connection with FIGS. 1A-1E.

As shown in FIG. 5, process 500 may include determining whether an area of interest is present in the field of view (block 520). For example, the device (e.g., using focus control component 120, processor 320, memory 330, storage component 340, input component 350, output component 360, communication interface, and/or the like) may determine whether an area of interest is present in the field of view, as described above in connection with FIGS. 1A-1E.

As shown in FIG. 5, based on determining that the area of interest is not present in the field of view (block 520—No), process 500 may include adjusting the focus of the field of view based on at least one of a focus speed associated with the input or a focus acceleration associated with the input (block 530). For example, the device (e.g., using lens 114, focus control component 120, processor 320, memory 330, storage component 340, input component 350, output component 360, communication interface, and/or the like) may adjust the focus of the field of view based on at least one of a focus speed associated with the input or a focus acceleration associated with the input, as described above in connection with FIGS. 1A-1E.

As shown in FIG. 5, based on determining that the area of interest is present in the field of view (block 520—Yes), process 500 may include determining one or more parameters for modifying at least one of the focus speed or the focus acceleration (block 540). For example, the device (e.g., using focus control component 120, processor 320, memory 330, storage component 340, input component 350, output component 360, communication interface, and/or the like) may determine one or more parameters for modifying at least one of the focus speed or the focus acceleration, as described above in connection with FIGS. 1A-1E.

As shown in FIG. 5, based on determining that the area of interest is present in the field of view (block 520—Yes), process 500 may include modifying at least one of the focus speed or the focus acceleration based on the one or more parameters (block 550). For example, the device (e.g., using focus control component 120, processor 320, memory 330, storage component 340, input component 350, output component 360, communication interface, and/or the like) may modify at least one of the focus speed or the focus acceleration based on the one or more parameters, as described above in connection with FIGS. 1A-1E.

As shown in FIG. 5, based on determining that the area of interest is present in the field of view (block 520—Yes), process 500 may include adjusting the focus of the field of view based on at least one of the modified focus speed or the modified focus acceleration (block 560). For example, the device (e.g., using lens 114, focus control component 120, processor 320, memory 330, storage component 340, input component 350, output component 360, communication interface, and/or the like) may adjust the focus of the field of view based on at least one of the modified focus speed or the modified focus acceleration, as described above in connection with FIGS. 1A-1E.

Process 500 may include additional implementations, such as any single implementation or any combination of implementations described below and/or in connection with one or more other processes described elsewhere herein.

In a first implementation, determining whether the area of interest is present in the field of view comprises determining a level of contrast in the field of view, and determining whether the area of interest is present in the field of view based on the level of contrast in the field of view. In a second implementation, alone or in combination with the first implementation, determining the one or more parameters for modifying the focus speed comprises determining whether the focus speed associated with the input satisfies a threshold focus speed, and determining to modify the focus speed by reducing the focus speed to the threshold focus speed. In a third implementation, alone or in combination with one or more of the first or second implementations, modifying the focus speed based on the one or more parameters comprises reducing the focus speed to the threshold focus speed.

In a fourth implementation, alone or in combination with one or more of the first through third implementations, determining the one or more parameters for modifying at least one of the focus speed or the focus acceleration comprises determining whether the focus acceleration associated with the input satisfies a threshold focus acceleration and determining to modify the focus acceleration by reducing the focus acceleration to the threshold focus acceleration. In a fifth implementation, alone or in combination with one or more of the first through fourth implementations, modifying at least one of the focus speed or the focus acceleration based on the one or more parameters comprises reducing the focus acceleration to the threshold focus acceleration. In a sixth implementation, alone or in combination with one or more of the first through fifth implementations, process 500 further comprises determining the focus speed and determining the focus acceleration.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
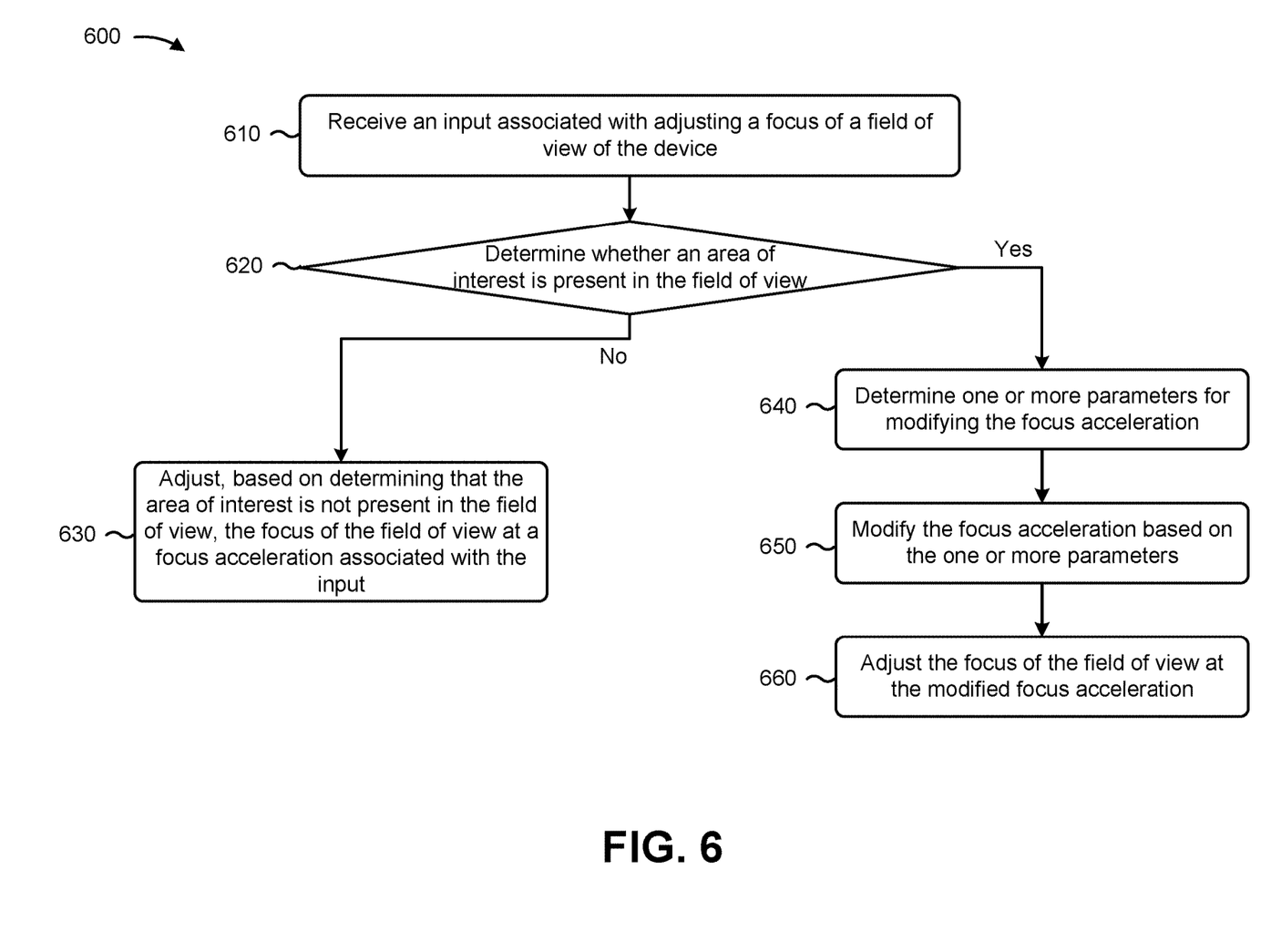

FIG. 6 is a flow chart of an example process 600 for context-based focus control of a microscope. In some implementations, one or more process blocks of FIG. 6 may be performed by a device (e.g., device 220). In some implementations, one or more process blocks of FIG. 6 may be performed by another device or a group of devices separate from or including the device, such as a client/server device (e.g., client/server device 230).

As shown in FIG. 6, process 600 may include receiving an input associated with adjusting a focus of a field of view of the device (block 610). For example, the device (e.g., using focus control component 120, input component 122, processor 320, memory 330, storage component 340, input component 350, output component 360, communication interface, and/or the like) may receive an input associated with adjusting a focus of a field of view of the device, as described above in connection with FIGS. 1A-1E.

As shown in FIG. 6, process 600 may include determining whether an area of interest is present in the field of view (block 620). For example, the device (e.g., using focus control component 120, processor 320, memory 330, storage component 340, input component 350, output component 360, communication interface, and/or the like) may determine whether an area of interest is present in the field of view, as described above in connection with FIGS. 1A-1E.

As shown in FIG. 6, based on determining that the area of interest is not present in the field of view (block 620—No), process 600 may include adjusting the focus of the field of view at a focus acceleration associated with the input (block 630). For example, the device (e.g., using lens 114, focus control component 120, processor 320, memory 330, storage component 340, input component 350, output component 360, communication interface, and/or the like) may adjust the focus of the field of view at a focus acceleration associated with the input, as described above in connection with FIGS. 1A-1E.

As shown in FIG. 6, based on determining that the area of interest is present in the field of view (block 420—Yes), process 400 may include determining one or more parameters for modifying the focus acceleration (block 640). For example, the device (e.g., using focus control component 120, processor 320, memory 330, storage component 340, input component 350, output component 360, communication interface, and/or the like) may determine one or more parameters for modifying the focus acceleration, as described above in connection with FIGS. 1A-1E.

As shown in FIG. 6, based on determining that the area of interest is present in the field of view (block 620—Yes), process 600 may include modifying the focus accceleration based on the one or more parameters (block 650). For example, the device (e.g., using focus control component 120, processor 320, memory 330, storage component 340, input component 350, output component 360, communication interface, and/or the like) may modify the focus acceleration based on the one or more parameters, as described above in connection with FIGS. 1A-1E.

As shown in FIG. 6, based on determining that the area of interest is present in the field of view (block 620—Yes), process 600 may include adjusting the focus of the field of view at the modified focus acceleration (block 660). For example, the device (e.g., using lens 114, focus control component 120, processor 320, memory 330, storage component 340, input component 350, output component 360, communication interface, and/or the like) may adjust the focus of the field of view at the modified focus acceleration, as described above in connection with FIGS. 1A-1E.

Process 600 may include additional implementations, such as any single implementation or any combination of implementations described below and/or in connection with one or more other processes described elsewhere herein.

In a first implementation, determining whether the area of interest is present in the field of view comprises determining a level of contrast in the field of view, and determining whether the area of interest is present in the field of view based on the level of contrast in the field of view. In a second implementation, alone or in combination with the first implementation, determining the one or more parameters for modifying the focus acceleration comprises determining whether the focus acceleration associated with the input satisfies a threshold focus acceleration, and determining to modify the focus acceleration by reducing the focus acceleration to the threshold focus acceleration. In a third implementation, alone or in combination with one or more of the first or second implementations, modifying the focus acceleration based on the one or more parameters comprises reducing the focus acceleration to the threshold focus acceleration.

In a fourth implementation, alone or in combination with one or more of the first through third implementations, determining whether the area of interest is present in the field of view comprises determining a difference in illuminance in the field of view and determining whether the area of interest is present in the field of view based on the difference in illuminance in the field of view. In a fifth implementation, alone or in combination with one or more of the first through fourth implementations, determining whether the area of interest is present in the field of view comprises determining a difference in color in the field of view and determining whether the area of interest is present in the field of view based on the difference in color in the field of view.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the device may be capable of context-based focus control. The device may receive an input associated with adjusting a focus of a field of view of the device, may determine whether an area of interest is present in the field of view, may determine one or more parameters for modifying the input based on whether the area of interest is present in the field of view, and may modify the input based on the one or more parameters. In this way, the device may adjust the focus of the field of view based on the modified input, such that the device may adjust the focus at a high focus speed when the area of interest is not present in the field of view, and may switch to a slower and more precise focus speed when the area of interest is present in the field of view. This increases the device's manual focus capabilities, by allowing the device to quickly reach the area of interest in the field of view, and by overriding technician input to slow down focus adjustments to a more granular and precise focus speed once the area of interest has been reached. Further, this conserves processing resources of the device by reducing the likelihood of overshoot of the point of optimal focus due to the device adjusting the focus too quickly when the device is close to achieving the point of optimal focus.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, and/or the like), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, at a microscope, an input associated with adjusting a focus of a field of view of the microscope;
   determining, by the microscope, whether an area of interest is present in the field of view; and
   adjusting, by the microscope and based on determining that the area of interest is not present in the field of view, the focus of the field of view at a focus speed associated with the input; or
   based on determining that the area of interest is present in the field of view:
      determining, by the microscope, one or more parameters for modifying the focus speed,
      modifying, by the microscope, the focus speed based on the one or more parameters, and
      adjusting, by the microscope, the focus of the field of view at the modified focus speed.

2. The method of claim 1, wherein determining whether the area of interest is present in the field of view comprises:
   determining a level of contrast in the field of view; and
   determining whether the area of interest is present in the field of view based on the level of contrast in the field of view.

3. The method of claim 1, wherein determining the one or more parameters for modifying the focus speed comprises:
   determining whether the focus speed associated with the input satisfies a threshold focus speed; and
   determining to modify the focus speed by reducing the focus speed to the threshold focus speed.

4. The method of claim 3, wherein modifying the focus speed based on the one or more parameters comprises:
   reducing the focus speed to the threshold focus speed.

5. The method of claim 1, wherein the input is associated with a focus acceleration.

6. The method of claim 5, further comprising:
   adjusting, based on determining that the area of interest is not present in the field of view, the focus of the field of view at the focus acceleration associated with the input.

7. The method of claim 5, further comprising:
   determining, based on determining that the area of interest is present in the field of view, a modified focus acceleration; and
   adjusting the focus of the field of view at the modified focus acceleration.

8. The method of claim 1, wherein the input is associated with actuation of a joystick at a particular displacement in a particular direction.

9. A device, comprising:
   an input component; and
   a focus control component configured to:
      receive, from the input component, an input associated with adjusting a focus of a field of view of the device;
      determine whether an area of interest is present in the field of view; and
      adjust, based on determining that the area of interest is not present in the field of view, the focus of the field of view based on at least one of a focus speed associated with the input or a focus acceleration associated with the input; or
      based on determining that the area of interest is present in the field of view:

determine one or more parameters for modifying at least one of the focus speed or the focus acceleration,
  wherein the focus control component, when determining the one or more parameters for modifying at least one of the focus speed or the focus acceleration, is to:
   determine whether the focus acceleration associated with the input satisfies a threshold focus acceleration; and
   determine to modify the focus acceleration by reducing the focus acceleration to the threshold focus acceleration,
  modify at least one of the focus speed or the focus acceleration based on the one or more parameters, and
  adjust the focus of the field of view based on at least one of the modified focus speed or the modified focus acceleration.

10. The device of claim 9, wherein the focus control component, when determining whether the area of interest is present in the field of view, is to:
  determine a level of contrast in the field of view; and
  determine whether the area of interest is present in the field of view based on the level of contrast in the field of view.

11. The device of claim 9, wherein the focus control component, when determining the one or more parameters for modifying at least one of the focus speed or the focus acceleration, is to:
  determine whether the focus speed associated with the input satisfies a threshold focus speed; and
  determine to modify the focus speed by reducing the focus speed to the threshold focus speed.

12. The device of claim 11, wherein the focus control component, when modifying at least one of the focus speed or the focus acceleration based on the one or more parameters, are to:
  reduce the focus speed to the threshold focus speed.

13. The device of claim 9, wherein the focus control component, when modifying at least one of the focus speed or the focus acceleration based on the one or more parameters, are to:
  reduce the focus acceleration to the threshold focus acceleration.

14. The device of claim 9, wherein the focus control component is further to:
  determine the focus speed; and
  determine the focus acceleration.

15. The device of claim 9, wherein the input is associated with one or more of:
  a particular focus speed,
  a particular focus acceleration, or
  a particular focus direction.

16. A non-transitory computer-readable medium storing instructions, the instructions comprising:
  one or more instructions that, when executed by one or more processors of a device, cause the one or more processors to:
   receive an input associated with adjusting a focus of a field of view of the device;
   determine whether an area of interest is present in the field of view; and
   adjust, based on determining that the area of interest is not present in the field of view, the focus of the field of view at a focus acceleration associated with the input; or
   based on determining that the area of interest is present in the field of view:
    determine one or more parameters for modifying the focus acceleration,
     wherein the one or more instructions, that cause the one or more processors to determine the one or more parameters for modifying the focus acceleration, cause the one or more processors to:
      determine whether the focus acceleration associated with the input satisfies a threshold focus acceleration; and
      determine to modify the focus acceleration by reducing the focus acceleration to the threshold focus acceleration,
    modify the focus acceleration based on the one or more parameters, and
    adjust the focus of the field of view at the modified focus acceleration.

17. The non-transitory computer-readable medium of claim 16, wherein the one or more instructions, that cause the one or more processors to determine whether the area of interest is present in the field of view, cause the one or more processors to:
  determine a level of contrast in the field of view; and
  determine whether the area of interest is present in the field of view based on the level of contrast in the field of view.

18. The non-transitory computer-readable medium of claim 16, wherein the one or more instructions, that cause the one or more processors to modify the focus acceleration based on the one or more parameters, cause the one or more processors to:
  reduce the focus acceleration to the threshold focus acceleration.

19. The non-transitory computer-readable medium of claim 16, wherein the one or more instructions, that cause the one or more processors to determine whether the area of interest is present in the field of view, cause the one or more processors to:
  determine a difference in illuminance in the field of view; and
  determine whether the area of interest is present in the field of view based on the difference in illuminance in the field of view.

20. The non-transitory computer-readable medium of claim 16, wherein the one or more instructions, that cause the one or more processors to determine whether the area of interest is present in the field of view, cause the one or more processors to:
  determine a difference in color in the field of view; and
  determine whether the area of interest is present in the field of view based on the difference in color in the field of view.

* * * * *